Patented Apr. 25, 1950

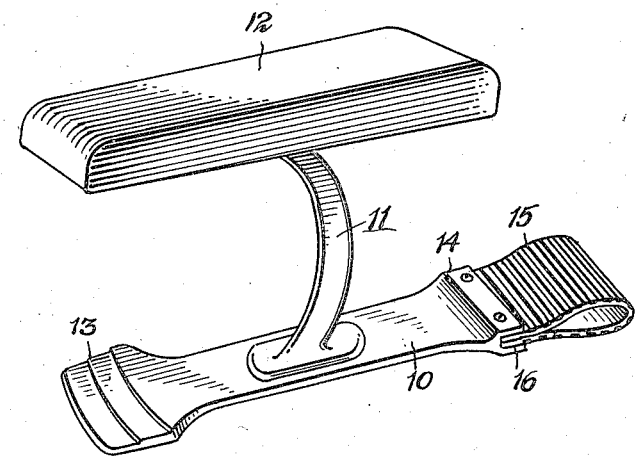
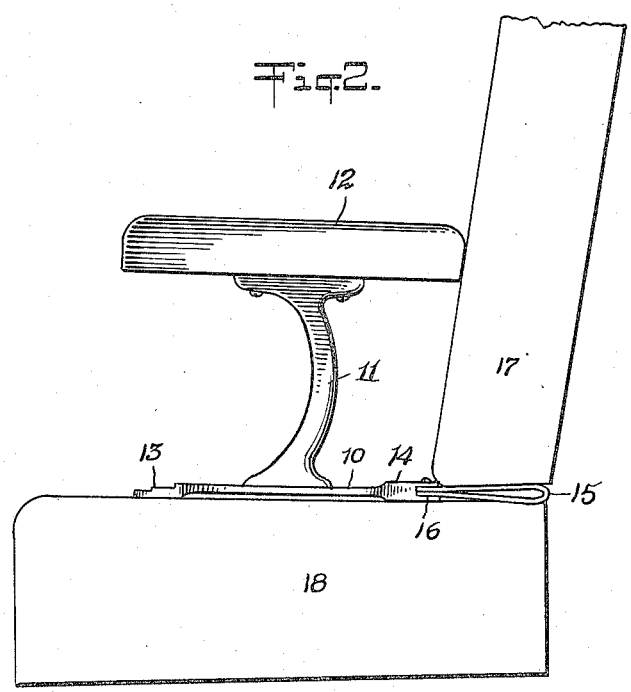

2,505,463

UNITED STATES PATENT OFFICE 2,505,463

ATTACHMENT FOR VEHICLE SEATS

Louis Crane, Brooklyn, N. Y.

Application February 25, 1949, Serial No. 78,393

4 Claims. (Cl. 155—112)

This invention relates to new and useful improvements in attachment for vehicle seats.

In most ordinary vehicles, except the more expensive types of automobiles, seats are not provided with arm rests and it is an object of this invention to provide an attachment for a vehicle seat which is simple, efficient, durable, economical to manufacture and readily attached to and removed from the seat. This attachment is contemplated to take the form of a pad, seat cover, or a plate or base support for an arm rest.

A further object is to provide such a plate or sheet which can be disposed on top of the seat and efficiently and securely anchored in position by a very simple anchorage element.

A further object is to provide a simple and efficient device which is made of a very minimum number of parts, which can be economically purchased and similarly assembled for efficient use.

Further and more specific objects, features, and advantages will more clearly appear from a consideration of the detailed specification hereinafter set forth especially when taken in connection with the accompanying drawings which illustrate a present preferred form which the invention may assume and which form part of the specification.

In brief and general terms, the invention, in its broadest aspect, concerns a plate or sheet which is placed upon the top of the vehicle seat. This plate may be merely a pad or cover for the seat to protect the surface of the seat itself from undue wear, or it may be a base or supporting plate for an arm rest or for any other purpose. Along the rear edge of this sheet or plate, is disposed an anchor element of wedge-shape which projects from the rear edge of the sheet and is disposed beneath the bottom of the back of the seat. Preferably, this anchor element is in the form of a folded sheet of resilient material preferably corrugated rubber, a sponge rubber casting or similar substance, which has a natural tendency to expand or contract to conform with the shape of the space between the seat and its back and, to maintain a wedge-shape so that when it is shoved beneath the back of the vehicle seat to anchor the sheet on top of the seat, it will tend to maintain itself in latched position and thereby hold the sheet, cover or base plate in position.

In a preferred form, the plate resting on the seat may act as a base to support an arm rest.

The present preferred form which the invention may assume, is shown in the figures as an arm rest which can be quickly and easily disposed in operative position and as quickly removed therefrom.

In the drawings:

Fig. 1 is a perspective view of the device; and,

Fig. 2 is a side elevation of the device in operative relation with the seat of a vehicle.

Referring now merely to the specific embodiment of the invention shown in the drawing and aware that the invention relates to and may involve several other forms, it is to be noted that there is provided an elongated plate 10 preferably of stiff material, to the top of which is connected a rigid pedestal 11 and to the top of this in turn, is connected a horizontal bar 12 to act as an arm rest. In the form shown, the forward and rear portions of the base plate 10 are enlarged as at 13 and 14 and the rear portion is provided with a slot 16 into which the free ends of the anchor 15 are disposed and suitably fastened as by screws, or cement, or any other means of fastening.

Preferably, the anchor element is made of flexible material and in a particular form, it is made of a relatively thick sheet of transversely corrugated rubber as shown in Figure 1. This sheet is folded and the free ends are disposed in the recess or slot 16 of the sheet or base plate 10 and secured therein in any desired manner. The natural qualities and characteristics of the anchor material will tend to maintain it in a somewhat wedge-shape form as shown in Figure 1, but its flexibility will enable it to be shoved in beneath the back 17 of an automobile seat when the plate or sheet 10 is disposed on top of the seat 18, as shown in Figure 2. This will tend to flatten out the flexible wedge, but its resiliency will cause it to resist withdrawal from beneath the back to a certain extent and thus tend to hold the sheet or plate 10 in position.

A fact that the anchor is made of flexible material preferably transversely corrugated, will further increase the resistance offered by it to movement in withdrawal. Although it is not shown, the sheet 10 itself may be roughened, preferably on the bottom.

It is of course, to be clearly understood that I have shown this invention embodied in connection with an arm rest for an automobile seat, but of course it is quite clear that the plate 10 instead of being the base for an arm rest may merely be a seat pad for an individual seat or a cover for the entire vehicle seat, the rear edge of which is adapted to receive and be related to an anchor element of the general form shown.

The device is simple, economical, efficient, durable and it is quite obvious that it can be disposed in operative position and removed therefrom in a matter of seconds. It can be made economically and therefore offered to the public at a very fair price, where an arm rest or similar device is required in the ordinary-priced cars which are not supplied with such devices.

While the invention has been described in detail and with respect to the preferred form shown in the drawings, it is not to be limited to such details and forms since many changes and modifications may be made in the invention without departing from the spirit and scope of the invention in its broadest aspects. Hence, it is intended to cover any and all forms and modifications of the invention which may come within the language or scope of any one or more of the appended claims.

What I claim as my invention, is:

1. An attachment for vehicle seats which comprises a plate to be disposed on top of the seat, the rear edge of said plate having a slot, an anchor element in the form of a folded flexible sheet of corrugated material, the free ends of which are fastened in said slot, said anchor element adapted to extend beneath the back of the vehicle seat and to tend to hold the plate in position on the seat due to its resiliency.

2. An attachment for vehicle seats which comprises an elongate plate to be disposed on top of the seat, the rear edge of said plate having a slot, an anchor element in the form of a folded flexible sheet of stiff material of rubber having transverse corrugation, the free ends of which are fastened in said slot, said anchor element adapted to extend beneath the back of the vehicle seat and to tend to hold the plate in position on the seat due to its resiliency, said corrugated anchor element as formed assuming the shape of a wedge increasing in depth from the rear end of the plate outward.

3. An attachment for vehicle seats which comprises a plate to be disposed on the top of the seat, an anchor element in the form of a folded flexible sheet of material with its free ends connected to one end of said plate, said anchor element adapted to extend beneath the back of the seat and tending to hold the plate in position on the seat.

4. An attachment for vehicle seats which comprises an elongate plate to be disposed on top of the seat, an anchor element in the form of a folded sheet of relatively stiff flexible material with its free ends fastened to one end of said plate, said anchor element adapted to extend beneath the back of the seat and tending to hold the plate in position on the seat due to the natural flexibility of the material, said element tending to assume a wedge shape increasing in depth from the rear end of the plate outwardly therefrom.

LOUIS CRANE.

REFERENCES CITED

The following references are of record in the file of this patent:

UNITED STATES PATENTS

| Number | Name | Date |
|--------|------|------|
| 1,397,281 | Haas | Nov. 15, 1921 |
| 2,043,626 | Morrison | June 9, 1936 |
| 2,086,244 | Smith | July 6, 1937 |
| 2,172,890 | Phillips | Sept. 12, 1939 |
| 2,308,315 | Smith | Jan. 12, 1943 |